United States Patent
Bleckmann et al.

(10) Patent No.: US 12,544,327 B2
(45) Date of Patent: *Feb. 10, 2026

(54) BODY MILK

(71) Applicant: BEIERSDORF AG, Hamburg (DE)

(72) Inventors: Andreas Bleckmann, Ahrensburg (DE); Sabine Sellckau, Hamburg (DE); Svea Wischhoefer, Hamburg (DE)

(73) Assignee: BEIERSDORF AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,653

(22) Filed: Feb. 16, 2024

(65) Prior Publication Data

US 2024/0285505 A1 Aug. 29, 2024

(30) Foreign Application Priority Data

Feb. 21, 2023 (DE) .......................... 102023201536.6

(51) Int. Cl.

| | | |
|---|---|---|
| *A61K 8/73* | (2006.01) | |
| *A61K 8/06* | (2006.01) | |
| *A61K 8/37* | (2006.01) | |
| *A61K 8/67* | (2006.01) | |
| *A61K 8/92* | (2006.01) | |
| *A61Q 19/00* | (2006.01) | |

(52) U.S. Cl.
CPC .............. *A61K 8/735* (2013.01); *A61K 8/064* (2013.01); *A61K 8/375* (2013.01); *A61K 8/678* (2013.01); *A61K 8/922* (2013.01); *A61Q 19/007* (2013.01); *A61K 2800/30* (2013.01)

(58) Field of Classification Search
CPC ........ A61K 8/735; A61K 8/064; A61K 8/375; A61K 8/678; A61K 8/922; A61K 8/37; A61K 8/35; A61K 2800/30; A61Q 19/007; A61Q 17/04
USPC .......................................................... 514/54
See application file for complete search history.

(56) References Cited

U.S. PATENT DOCUMENTS

| | | |
|---|---|---|
| 4,605,691 A | 8/1986 | Balazs et al. |
| 4,713,448 A | 12/1987 | Balazs et al. |
| 7,282,471 B2 * | 10/2007 | Harichian .............. A61K 8/416 |
| | | 510/432 |
| 2021/0169771 A1 | 6/2021 | Schecker et al. |
| 2024/0091118 A1 | 3/2024 | Herwig |

FOREIGN PATENT DOCUMENTS

| | | | | |
|---|---|---|---|---|
| CN | 109303735 A | * | 2/2019 | ............... A61K 8/41 |
| DE | 202018002592 U1 | | 6/2018 | |
| DE | 102017221672 A1 | | 6/2019 | |
| DE | 102018217130 A1 | * | 4/2020 | ............... A61K 8/37 |
| DE | 102021200621 A1 | | 7/2022 | |
| EP | 2926801 A1 | * | 10/2015 | ............... A61K 8/39 |

OTHER PUBLICATIONS

Mintel, Aug. 5, 2021, pp. 1-4.*
Kubala, Nutrition, Jan. 20, 2021, pp. 1-24.*
Mubofu, Sustainable Chem Process, 2016, 4:11, pp. 1-12.*
Gallagher, Healthline Media, Sep. 30, 2019, pp. 1-20.*
Stoia et al, Applied Science Reports, 2015, 10(1), 45-49.*
Andersson et al, Cosmetics & Toiletries, 2015, pp. 1-7.*
Roso et al, Cosmetic Science Technology, 2012, pp. 1-5.*
Database GNPD [Online] Mintel; Jan. 20, 2023 (Jan. 20, 2023), anonymous: "Foundation SPF 50", database accession No. 10516604.
Database GNPD [Online] Mintel; Jul. 14, 2022 (Jul. 14, 2022), anonymous: "The Super Body Hydrator", database accession No. 975804.
Database GNPD [Online] Mintel; Jul. 12, 2022 (Jul. 12, 2022), anonymous: "L'Expression Marine Pine & Edelweiss Time Serum", database accession No. 9728974.
Database GNPD [Online] Mintel; Jul. 5, 2022 (Jul. 5, 2022), anonymous: "Balm SPF 50+ PA++", database accession No. 9714274.
Database. GNPD [Online] Mintel; Aug. 5, 2021 (Aug. 5, 2021), anonymous: "BB Cream SPF 50+ PA+++", database accession No. 8912723.

* cited by examiner

*Primary Examiner* — Ganapathy Krishnan
(74) *Attorney, Agent, or Firm* — Abel Schillinger, LLP

(57) ABSTRACT

A body milk for improved skin moisturization comprises hyaluronic acid and/or salts thereof, diisostearoyl polyglyceryl-3 dimer dilinoleate, polyglyceryl-4 diisostearate/polyhydroxystearate/sebacate, tocopherol, and one or more lipids selected from isopropyl palmitate, isododecane, almond oil (*Prunus amygdalus dulcis* oil), sunflower oil (*Helianthus annuus* seed oil), coco-caprylate/caprate, Butyrospermum parkii butter. The preparation is free of BHT.

19 Claims, No Drawings

BODY MILK

CROSS-REFERENCE TO RELATED APPLICATIONS

The present application claims priority under 35 U.S.C. § 119 of German Patent Application No. 102023201536.6, filed Feb. 21, 2023, the entire disclosure of which is expressly incorporated by reference herein.

BACKGROUND OF THE INVENTION

1. Field of the Invention

The present invention relates to a cosmetic or dermatological preparation comprising hyaluronic acid and/or salts thereof, diisostearoyl polyglyceryl-3 dimer dilinoleate, polyglyceryl-4 diisostearate/polyhydroxystearate/sebacate and tocopherol, and also one or more lipids selected from the group of isopropyl palmitate, isododecane, almond oil (*Prunus amygdalus dulcis* oil), sunflower oil (*Helianthus annuus* seed oil) and coco-caprylate/caprate, Butyrospermum parkii butter, the preparation being free from BHT.

2. Discussion of Background Information

External influences, in particular environmental influences, sun exposure and skin cleansing, lead to the skin's moisture balance being disturbed.

In order for the skin to be able to perform the full range of its biological functions, it requires regular cleansing and care. Skin care products, generally creams, ointments or lotions, mostly serve for moisturizing and refatting the skin. Active ingredients are commonly added thereto, which are intended to regenerate the skin and for example to prevent and reduce the premature aging thereof (e.g. the appearance of fine lines and wrinkles).

To care for the skin, consumers are nowadays offered a plurality of cosmetic preparations, usually in the form of creams and lotions, i.e. as an emulsion. Products which temporarily or permanently delay or eliminate the aging phenomena of the skin, negative environmental influences and even skin diseases are of ever-increasing importance. In addition to water for skin moisturization and oils and lipids for refatting of the skin, such skin care products comprise a plurality of active ingredients, auxiliaries and additives.

Hyaluronic acid (also according to nomenclature Hyaluronan, abbreviation HA, CAS: 9004-61-9) is a glycosaminoglycan that is an important constituent of connective tissue. HA is characterized by a repeating disaccharide unit according to the following structure:

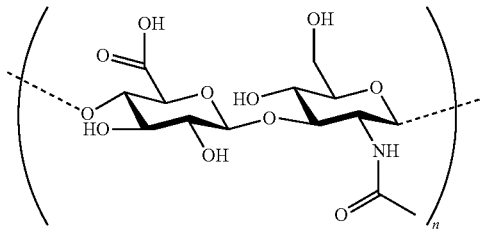

HA is a linear, acidic polysaccharide which consists of a plurality of alternating disaccharide units of 1,3-glycosidically linked N-acetyl-ß-D-glucosamine (GlcNAc) and ß-D-glucuronic acid (GlcA) molecules. Each of the disaccharidic base units is linked to the next by a ß(1-4) bond. The number of base units can reach more than 10,000 with a molar mass of 4 million daltons. Due to their hydrophilic acid groups and the hydroxyl groups, HA has the ability to form a plurality of hydrogen bonds via which hydrations can be added and it is therefore homogeneously miscible with water. In aqueous solution, HA is capable of binding more and more water with extension of the average chain spacing, since the negative charges cause repulsion of the chain sections that are close to one another. Under physiological conditions, the carboxyl groups of HA are practically completely dissociated and represent a polyanionic compound. The term hyaluronic acid is generally used irrespective of whether HA itself or the salts are meant. Due to the viscoelastic properties and its biocompatibility, HA is of therapeutic importance as an injection solution in ophthalmology, orthopedics and cosmetic surgery.

Hyaluronic acid is a natural constituent of the skin. In cosmetic products, use is made of two forms of hyaluronic acid, a short-chain and a long-chain form. The short-chain hyaluronic acid penetrates the upper layer of the skin and influences the inner moisture balance. By contrast, the long-chain hyaluronic acid is intended to exhibit a plumping-up effect on the skin. It effectively binds moisture in the upper layer of the skin. Its moisture-binding effect arises from the fact that it releases its hydrate mantle only gradually and thus acts on the skin over a long period. HA has the further functions of supplying connective tissue and skin with moisture and nutrients.

The sodium salt of hyaluronic acid is also used, among other things, as a moisturizer (humectant) for the production of cosmetic products (Römpp online Lexicon Version 2.5, 2004).

Hyaluronic acid is commercially available in the cross-linked state (for example Hylaform®, a crosslinked hyaluronic acid from Biomatrix, NJ, USA; for preparation cf. also U.S. Pat. Nos. 4,713,448, 4,605,691, APC® from Fidia, Incert® from Anika Therapeutics, Intergel® from LifeCore or Restylane® from Q-Med).

Recently, there has been a growing trend toward "natural" cosmetics, the ingredients of which should as far as possible no longer come from petroleum products or be chemically synthesized. This trend overlaps nowadays with the trend toward "vegan" products. The search for alternative ingredients that meet these criteria poses particular challenges for product developers. This is because the replacement of known ingredients such as mineral oils, silicone oils and polyacrylates is practically always at the expense of disadvantages with respect to the product properties. The preparations become unstable and sensorially unattractive, which is unpleasantly noticeable for example when spreading the preparation on the skin and by the inadequate absorption capacity. These problems occur in particular with water-in-oil emulsions (W/O emulsions), which have recently enjoyed a resurgence in popularity. For instance, W/O emulsions without mineral oils and mineral waxes and without polyethylene glycol ethers or esters (so-called PEG derivatives) tend to be more unstable. In the case of relatively long storage periods, particularly at relatively high temperatures, phase separations in the form of oil and/or water separations rapidly occur that also cannot readily be compensated for by a relatively high emulsifier content.

In view of the foregoing, it would be advantageous to have available a cosmetic or dermatological preparation which is free of BHT (butylated hydroxytoluene) and as far as possible dispenses with polyethylene glycol ethers and esters and advantageously is free from mineral oil, paraffin wax, microcrystalline wax, shellac wax and polyethylene waxes, free from polyacrylates, acrylate/C10-C30 alkyl acrylate crosspolymers and vinylpyrrolidone/hexadecene copolymers, and free from 3-(4-methylbenzylidene)camphor, 2-hydroxy-4-methoxybenzophenone (INCI: Oxybenzone), 2-ethylhexyl 4-methoxycinnamate (INCI: Octyl Methoxycinnamate), ethylhexyl 2-cyano-3,3-diphenylacrylate (INCI: Octocrylene), parabens (particularly methyl, propyl and butyl paraben), methylisothiazolinone, chloromethylisothiazolinone and DMDM hydantoin.

SUMMARY OF THE INVENTION

The present invention provides a cosmetic or dermatological preparation which comprises hyaluronic acid and/or salts thereof, diisostearoyl polyglyceryl-3 dimer dilinoleate, polyglyceryl-4 diisostearate/polyhydroxystearate/sebacate and tocopherol, as well as one or more lipids selected from isopropyl palmitate, isododecane, almond oil (*Prunus amygdalus dulcis* oil), sunflower oil (*Helianthus annuus* seed oil), coco-caprylate/caprate and Butyrospermum parkii butter, the preparation being free of BHT.

The preparation according to the invention is advantageously provided as a water-in-oil (W/O) emulsion and is present as a skin-moisturizing body milk.

Ideally, the preparations according to the invention are free from mineral oil, paraffin wax, microcrystalline wax, shellac wax, polyethylene waxes, polyacrylates, acrylate/C10-C30 alkyl acrylate crosspolymers, vinylpyrrolidone/hexadecene copolymers, 3-(4-methyl-benzylidene)camphor, 2-hydroxy-4-methoxybenzophenone (INCI: Oxybenzone), 2-ethylhexyl 4-methoxycinnamate (INCI: Octyl Methoxycinnamate), ethylhexyl 2-cyano-3,3-diphenylacrylate (INCI: Octocrylene), parabens (particularly methyl, propyl and butyl paraben), methylisothiazolinone, chloromethylisothiazolinone, DMDM hydantoin, polyethylene glycol ethers and polyethylene glycol esters.

"Free from" means that the proportion thereof is below 0.1% by weight.

Although DE 102017221672 and DE 102018217130, the entire disclosures of which are incorporated by reference herein, are known to those skilled in the art, these documents were unable to point the way to the present invention.

Hyaluronic acid and/or salts thereof are preferably added in a concentration of from 0.0005% to 5% by weight, preferably from 0.001% to 1% by weight, based on the total weight of the preparation.

The preparation advantageously comprises diisostearoyl polyglyceryl-3 dimer dilinoleate in a concentration of from 0.1% to 2.0% by weight, particularly preferred in a concentration of from 0.5% to 1.5% by weight, based on the total weight of the preparation.

The preparation advantageously comprises polyglyceryl-4 diisostearate/polyhydroxystearate/sebacate in a concentration of from 0.1% to 2.0% by weight, particularly preferred in a concentration of from 0.5% to 1.5% by weight, based on the total weight of the preparation.

Advantageously, polyglyceryl-4 diisostearate/polyhydroxystearate/sebacate and diisostearoyl polyglyceryl-3 dimer dilinoleate are present in a ratio by weight of from 3:1 to 1:2, in particular from 2:1 to 1:1.

Tocopherol is advantageously present in a concentration of from 0.01% to 2.0% by weight; particularly preferred in a concentration of from 0.05% to 1.5% by weight, based on the total weight of the preparation.

It is advantageous when one or more, preferably all lipids selected from isopropyl palmitate, isododecane, almond oil (*Prunus amygdalus dulcis* oil), sunflower oil (*Helianthus annuus* seed oil), coco-caprylate/caprate, Butyrospermum parkii butter are present in a concentration of from in each case 0.1% to 15% by weight, based on the total weight of the preparation.

It is preferred according to the invention if the preparation comprises coco-caprylate/caprate (INCI: Coco-Caprylate/Caprate). The use concentration according to the invention for coco-caprylate/caprate advantageously is from 0.5% to 5.0% by weight, based on the total weight of the preparation. Particular preference is given to a concentration of from 0.75% to 4.5% by weight, based on the total weight of the preparation.

Furthermore, advantageous embodiments of the present invention are characterized in that the preparation comprises one or more palmitates.

In particular, it is advantageous according to the invention if the preparation comprises cetyl palmitate and/or isopropyl palmitate.

If the preparation comprises cetyl palmitate, this component is advantageously used at a concentration of from 0.2% to 1% by weight, based on the total weight of the preparation. A particularly preferred concentration is from 0.3% to 0.8% by weight.

If the preparation comprises isopropyl palmitate, this component is advantageously used at a concentration of from 1.0% to 15.0% by weight, based on the total weight of the preparation. Particular preference is given to a concentration of from 3% to 12% by weight.

In addition, it is advantageous according to the invention if the preparation comprises shea butter and/or sunflower wax (INCI: *Helianthus Annuus* Seed Cera).

If the preparation comprises shea butter, this component is advantageously used at a concentration of from 0.5% to 3.0% by weight, particularly preferably in a concentration of from 0.75% to 2.5% by weight, based on the total weight of the preparation.

If the preparation comprises sunflower oil (INCI: *Helianthus Annuus* Seed Cera), this component is advantageously used at a concentration of from 0.05% to 1% by weight, particularly preferably at a concentration of from 0.1% to 0.5% by weight, based on the total weight of the preparation.

Advantageous embodiments of the present invention are further characterized in that the preparation comprises one or more plant oils.

It is preferred according to the invention if the preparation comprises one or more oils selected from almond oil compounds (INCI: *Prunus Amygdalus Dulcis* Oil) and/or sunflower oil compounds (INCI: *Helianthus Annuus* Seed Oil).

If the preparation comprises almond oil (INCI: *Prunus Amygdalus Dulcis* Oil), this component is advantageously used at a concentration of from 0.1% to 0.5% by weight, based on the total weight of the preparation.

If the preparation comprises sunflower oil (INCI: *Helianthus Annuus* Seed Oil), this component is advantageously used at a concentration of from 0.1% to 0.5% by weight, based on the total weight of the preparation.

It is preferred according to the invention if the preparation comprises hydrogenated castor oil (INCI: Hydrogenated Castor Oil) at a concentration of from 0.3% to 1.0% by weight, based on the total weight of the preparation.

Advantageously, the preparation according to the invention comprises one or more further skin humectants, particularly glycerin. These are each preferably used at a concentration of from 2% to 15% by weight, in particular from 3% to 10% by weight, advantageously from 4% to 8% by weight, in each case based on the total weight of the preparation.

Humectants, also referred to as moisturizers, are substances or substance mixtures which give cosmetic or dermatological preparations the property, once applied to or spread on the surface of the skin, of reducing the loss of moisture from the horny layer (also known as transepidermal water loss (TEWL)) and/or of having a beneficial effect on the hydration of the horny layer.

Advantageous moisturizers in the sense of the present invention are for example glycerin, butylene glycol, propylene carbonate. Further humectants are for example polymeric moisturizers from the group of the water-soluble and/or water-swellable polysaccharides and/or those that can be gelated with the aid of water.

Surprisingly, the combination of one or more lipids according to the invention, diisostearoyl polyglyceryl-3 dimer dilinoleate, polyglyceryl-4 diisostearate/polyhydroxystearate/sebacate and hyaluronic acid or salt thereof and, optionally, glycerin, proved to be a skin moisturizing complex, which is also called a moisture complex according to the invention.

The capacitance measurement principle of the Corneometer® is used worldwide and serves to determine the skin moisture level. Corneometer values can therefore be used to assess the skin's moisture balance and determined Corneometer data give an indication of the moisture content of the skin.

The combination according to the invention, the skin moisturizing complex, exhibits in each case higher and therefore improved Corneometer values in comparison with the untreated area of skin and compared to the area of skin treated only with in each case one constituent of the complex.

The moisture complex according to the invention promotes skin moisture and has a beneficial effect on the hydration of the horny layer of the skin.

In addition, the preparation according to the invention may comprise further ingredients that are customary for cosmetics.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description making apparent to those of skill in the art how the several forms of the present invention may be embodied in practice.

EXAMPLES

The examples which follow are intended to illustrate the present invention without limiting it. Unless otherwise indicated, all amounts, proportions and percentages are based on the weight and the total amount or on the total weight of the preparations.

| INCI | 1 % by weight | 2 % by weight | 3 % by weight |
|---|---|---|---|
| Tocopherol | 0.05 | 0.05 | 0.05 |
| Sodium Hyaluronate | 0.001 | 0.002 | 0.015 |
| Isopropyl Palmitate | 9.5 | 8.5 | 10 |
| Prunus Amygdalus Dulcis Oil | 0.2 | 0.3 | 0.1 |
| Plant Oil | 2 | 3 | 1.5 |
| Cetyl Palmitate | 0.5 | 0.5 | 0.7 |
| Coco-Caprylate/Caprate | 3 | 3.5 | 2.5 |
| Butyrospermum Parkii Butter | 1.8 | 2 | 1.5 |
| Hydrogenated Castor Oil | 0.5 | 0.6 | 0.4 |
| Isopropyl Stearate | 3.5 | 4 | 3 |
| Helianthus Annuus Seed Cera + Ascorbyl Palmitate + Tocopherol + Helianthus Annuus Seed Oil | 0.3 | 0.25 | 0.4 |
| Diisostearoyl polyglyceryl-3 dimer dilinoleate | 0.75 | 0.8 | 0.7 |
| Polyglyceryl-4 diisostearate/polyhydroxystearate/sebacate | 0.8 | 0.7 | 0.9 |
| Perfume | 0.35 | 0.3 | 0.4 |
| Glycerin + Aqua | 5 | 6 | 7 |
| Citric Acid | 0.086 | 0.9 | 0.7 |
| Sodium Citrate + Aqua | 0.174 | 0.18 | 0.17 |
| Potassium Sorbate | 0.125 | 0.1 | 0.2 |
| Magnesium Sulfate | 1.5 | 1.2 | 1.7 |
| Aqua | To 100 | To 100 | To 100 |

What is claimed is:

1. A cosmetic or dermatological preparation, wherein the preparation comprises hyaluronic acid and/or salts thereof, diisostearoyl polyglyceryl-3 dimer dilinoleate, polyglyceryl-4 diisostearate/polyhydroxystearate/sebacate, tocopherol, and at least three lipids selected from the group consisting of isopropyl palmitate, isododecane, almond oil (*Prunus amygdalus dulcis* oil), sunflower oil (*Helianthus annuus* seed oil), coco-caprylate/caprate, and Butyrospermum parkii butter, the preparation being free of butylated hydroxytoluene (BHT), mineral oil, paraffin wax, microcrystalline wax, shellac wax and polyethylene waxes, polyacrylates, acrylate/C10-C30 alkyl acrylate crosspolymers, vinylpyrrolidone/hexadecene copolymers, 3-(4-methyl-benzylidene) camphor, 2-hydroxy-4-methoxybenzophenone (INCI: Oxybenzone), 2-ethylhexyl 4-methoxycinnamate (INCI: Octyl Methoxycinnamate), ethylhexyl 2-cyano-3,3-diphenylacrylate (INCI: Octocrylene), parabens, methylisothiazolinone, chloromethylisothiazolinone, DMDM hydantoin, polyethylene glycol ethers and polyethylene glycol esters, and wherein the preparation is a water-in-oil emulsion (W/O emulsion).

2. The preparation of claim 1, wherein the preparation comprises hyaluronic acid and/or salts thereof in a concentration of from 0.0005% to 5% by weight, based on a total weight of the preparation.

3. The preparation of claim 1, wherein the preparation comprises diisostearoyl polyglyceryl-3 dimer dilinoleate in a concentration of from 0.1% to 2.0% by weight, based on a total weight of the preparation.

4. The preparation of claim 1, wherein the preparation comprises polyglyceryl-4 diisostearate/polyhydroxystearate/sebacate in a concentration of from 0.1% to 2.0% by weight, based on a total weight of the preparation.

5. The preparation of claim 1, wherein the preparation comprises polyglyceryl-4 diisostearate/polyhydroxystearate/sebacate and diisostearoyl polyglyceryl-3 dimer dilinoleate in a ratio by weight of from 3:1 to 1:2.

6. The preparation of claim 1, wherein the preparation comprises tocopherol in a concentration of from 0.01% to 2.0% by weight, based on a total weight of the preparation.

7. The preparation of claim 1, wherein the preparation comprises isopropyl palmitate in a concentration of from 3% to 15% by weight, based on a total weight of the preparation.

8. The preparation of claim 1, wherein the preparation comprises almond oil in a concentration of from 0.1% to 0.5% by weight, based on a total weight of the preparation.

9. The preparation of claim 1, wherein the preparation comprises coco-caprylate/caprate in a concentration of from 0.5% to 5.0% by weight, based on a total weight of the preparation.

10. The preparation of claim 1, wherein the preparation comprises Butyrospermum parkii butter in a concentration of from 0.5% to 3.0% by weight, based on a total weight of the preparation.

11. The preparation of claim 1, wherein the preparation comprises sunflower oil in a concentration of from 0.1% to 0.5% by weight, based on a total weight of the preparation.

12. The preparation of claim 1, wherein the preparation comprises at least four lipids selected from the group consisting of isopropyl palmitate, almond oil, sunflower oil, coco-caprylate/caprate and Butyrospermum parkii butter.

13. The preparation of claim 1, wherein the preparation comprises isopropyl palmitate, almond oil, sunflower oil, coco-caprylate/caprate, and Butyrospermum parkii butter.

14. The preparation of claim 1, wherein the preparation comprises at least three of (i) from 0.1% to 0.5% by weight of almond oil, (ii) from 0.75% to 4.5% by weight of coco-caprylate/caprate, (iii) from 0.75% to 2.5% by weight of Butyrospermum parkii butter, and (iv) from 0.1% to 0.5% by weight of sunflower oil, each based on a total weight of the preparation.

15. The preparation of claim 14, wherein the preparation comprises from 0.5% to 1.5% by weight of diisostearoyl polyglyceryl-3 dimer dilinoleate and from 0.5% to 1.5% by weight of polyglyceryl-diisostearate/polyhydroxystearate/sebacate, each based on a total weight of the preparation.

16. The preparation of claim 1, wherein the preparation further comprises cetyl palmitate.

17. The preparation of claim 1, wherein the preparation further comprises glycerin.

18. The preparation of claim 1, wherein the preparation further comprises hydrogenated castor oil.

19. The preparation of claim 1, wherein the preparation is free also from silicone oils.

* * * * *